(12) United States Patent  
Maennich et al.

(10) Patent No.: US 12,442,087 B2  
(45) Date of Patent: Oct. 14, 2025

(54) METHOD AND SYSTEM FOR COATING A METALLIC SUPPORT PROFILE WITH A LAYER OF A CORROSION-RESISTANT MATERIAL

(71) Applicant: Premium Aerotec GmbH, Augsburg (DE)

(72) Inventors: Ralph Maennich, Aichach (DE); Manuel Stiegelmeyr, Augsburg (DE); Matthias Bensch, Augsburg (DE); Thomas Geipel, Augsburg (DE); Kilian Dallinger, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 139 days.

(21) Appl. No.: 17/704,569

(22) Filed: Mar. 25, 2022

(65) Prior Publication Data

US 2023/0064566 A1    Mar. 2, 2023

(30) Foreign Application Priority Data

Aug. 27, 2021   (DE) .................... 10 2021 122 287.7

(51) Int. Cl.
| | |
|---|---|
| B32B 37/10 | (2006.01) |
| B32B 37/12 | (2006.01) |
| C23F 11/00 | (2006.01) |

(52) U.S. Cl.
CPC .............. *C23F 11/00* (2013.01); *B32B 37/10* (2013.01); *B32B 37/1018* (2013.01);
(Continued)

(58) Field of Classification Search
CPC . B32B 37/10; B32B 37/1009; B32B 37/1018; C23F 11/00
See application file for complete search history.

(56) References Cited

U.S. PATENT DOCUMENTS 3,614,811 A * 10/1971 Johnson ................... B29C 51/28
                                                              425/389
2005/0077006 A1* 4/2005 Yokoyama .......... B32B 37/1018
                                                              156/286
(Continued)

FOREIGN PATENT DOCUMENTS

| DE | 3935562 A1 | 5/1991 |
|---|---|---|
| DE | 4112607 A1 | 10/1992 |

(Continued)

*Primary Examiner* — Philip C Tucker  
*Assistant Examiner* — John Blades  
(74) *Attorney, Agent, or Firm* — Lerner David LLP

(57) ABSTRACT

A method for coating a metallic support profile with a layer of a corrosion-resistant material, includes providing the metallic support profile with a surface to be coated, providing a layer element of the corrosion-resistant material adapted to the surface to be coated, applying an adhesive, curable substance to at least one of the surface to be coated and the layer element, applying the layer element to the surface to be coated, covering the arrangement of support profile and layer element by a compacting element, pressing the layer element onto the surface to be coated by the compacting element to achieve a predetermined joint thickness occupied by the adhesive substance, curing the adhesive substance while maintaining the joint thickness to generate a bond, and removing the compacting element.

6 Claims, 3 Drawing Sheets

(52) U.S. Cl.
CPC ........ *B32B 37/12* (2013.01); *B32B 2307/752* (2013.01); *B32B 2605/18* (2013.01)

(56) References Cited

U.S. PATENT DOCUMENTS

2015/0158211 A1* 6/2015 Gensewich ............. B29C 43/12
 425/388
2019/0202144 A1* 7/2019 Wanner ............... B29C 43/3642

FOREIGN PATENT DOCUMENTS

| DE | 102017208038 A1 | | 11/2018 | |
|----|----|----|----|----|
| JP | 2004-244652 | * | 9/2004 | ............. B32B 15/01 |

* cited by examiner

METHOD AND SYSTEM FOR COATING A METALLIC SUPPORT PROFILE WITH A LAYER OF A CORROSION-RESISTANT MATERIAL

TECHNICAL FIELD

The present description relates to a method for coating a metallic support profile with a layer of a corrosion-resistant material, and to a system for coating a metallic support profile with a layer of a corrosion-resistant material.

TECHNICAL BACKGROUND

In aircraft, especially commercial aircraft for the transport of passengers, installations and systems are exposed to a wide variety of influences for which they are adapted accordingly. For example, various types of rails are arranged in the cabin of a commercial aircraft. These rails are used for the structural attachment of seats and monuments and are subjected to high demands in terms of corrosion, among other things, during ongoing flight operations. Currently, the profile structures used for this purpose are made of either aluminum or titanium alloys. Aluminum rails are relatively inexpensive to purchase. However, due to the low resistance of aluminum to corrosive influences during series production of the aircraft, they frequently have to be replaced during maintenance work, which entails high additional costs. In the case of titanium rails, however, the situation is exactly the opposite. The manufacturing costs for titanium rails are around 8-20 times higher than for the alternative aluminum rails.

DESCRIPTION

An aspect may relate to an alternative realization of a rail for an aircraft, in which a low-cost production or use is possible and leads to a very effective corrosion protection.

A method is proposed for coating a metallic support profile with a layer of a corrosion-resistant material, comprising providing the metallic support profile with a surface to be coated, providing a layer element of the corrosion-resistant material adapted to the surface to be coated, applying an adhesive, curable substance to at least one of the surface to be coated and the layer element, applying the layer element to the surface to be coated, covering the arrangement of support profile and layer element by a compacting element, pressing the layer element onto the surface to be coated by means of the compacting element to obtain a predetermined joint thickness occupied by the adhesive substance, curing the adhesive substance while maintaining the joint thickness to generate a bond, and removing the compacting element.

Providing the metallic support profile with the surface to be coated may include creating, procuring and/or preparing the support profile. The support profile may be made of aluminum or another metallic material, which is to be provided with improved corrosion protection by means of an additional coating. The support profile may already be provided with a suitable dimension when it is provided, so that the coating with the corrosion-resistant material takes place on a finally formed support profile. However, it is also conceivable to carry out any necessary cutting or adjustment only after coating. Furthermore, the providing may also include the holding of the support profile for subsequent processing. The support profile is preferably an elongated or rod-shaped workpiece that has a constant cross-section. The cross-section preferably has two or more major surfaces at an angle to each other. For example, the cross-section of the support profile has one or more chords and one or more webs. The support profile may also be a hollow profile. Exemplarily, the support profile comprises a lower chord and an upper chord at a distance to each other, wherein a surface of the upper chord facing away from the lower chord is to be coated. In particular, the support profile is made of an aluminum alloy. Exemplarily, the support profile is a seat rail for an aircraft cabin or an installation rail for cabin installations.

The subsequent providing of a layer element made of the corrosion-resistant material and adapted to the surface to be coated may involve adapting the layer element to the desired dimensions. This may be done, for example, by cutting a corresponding workpiece. However, the layer element may also be designed so that it is applicable to the surface to be coated without any further adaptation work, where it performs the intended function. The dimensions before application of the layer element may therefore correspond to the required dimensions, so that after application of the layer element the coating has the desired dimensions.

The layer element may comprise a metallic sheet that has a low thickness. In particular, the layer element may be a thin metal sheet, especially a titanium sheet or foil. The thickness of the sheet may be well below one millimeter, for example in the range of 0.002 to 0.25 mm. Alternatively, non-metallic foils may also be used.

Applying the adhesive curable substance to at least one of the surface to be coated and the layer element may include applying a liquid or paste material. The applying may be achieved by spraying, rolling, brushing, doctoring or other processes. The substance may be a sealant commonly used in aircraft construction that is characterized by high toughness. Furthermore, it is conceivable to apply a curable substance in the form of an initially solid, cohesive and, within certain limits, dimensionally stable laminate to the surface to be coated and to make it capable of crosslinking by a subsequent action during the process, so that curing can then take place. This may involve the addition of a solvent, heating, or other processes.

The layer element is then applied, for example laid, onto the surface to be coated. Depending on the size and shape of the support profile, it may be useful to unroll the layer element from a kind of spool and to apply it continuously to the relevant surface. It is further conceivable to handle the layer element by means of a gripping or holding device and to position it on the surface concerned. Vacuum devices with suction may could be used here, which can produce a force-fit connection with the layer element by applying a vacuum.

The compacting element is a mechanical element which, due to its dimensions and shape, is able to cover the arrangement of support profile and layer element. The layer element can be pressed by the compacting element onto the surface to be coated, whereby a two-dimensional contact between the layer element and the compacting element is particularly advantageous for this purpose. This ensures uniform pressure on the layer element. The compacting element is preferably a flat element, which in particular exceeds the dimensions of the surface to be coated. Particularly preferably, the compacting element can be pressed onto the layer element by means of a pressure acting on one side. It is an objective to cause a predetermined joint thickness taken up by the adhesive material by the process of pressing on.

During curing of the adhesive substance, the joint thickness is maintained by maintaining a contact pressure or force until the adhesive substance has solidified. This establishes a bond between the support profile and the layer element. Once curing is complete, the compacting element is removed again.

The method according to the invention provides a cost-effective means of applying thin sheets or foils of corrosion-resistant titanium or other materials to a support profile, which can be shaped to a large extent as desired. Various adhesive materials adapted to the intended use can be used, for example sealing compounds commonly used in aircraft construction, which are characterized by high toughness. As a result, particularly thin (0.05-0.1 mm) and uniform or specifically different joint thicknesses can be realized even on longer profile rails, which may have lengths of several meters.

In one embodiment, providing the support profile comprises holding the support profile in a receptacle, wherein covering by a compacting element comprises covering by a gas-impermeable membrane sealingly connected to the receptacle or a cover disposed thereover, and wherein pressing on the layer element comprises evacuating a space between the receptacle and the membrane or increasing the pressure in a space between the membrane and the cover. Holding the support profile in the receptacle fixes its position. The gas-impermeable membrane as a compacting element may form an intermediate space with the receptacle or the cover, which serves to provide a pressure in the form of an overpressure or a vacuum. The intermediate space may be brought into fluid communication with a conveying unit, the conveying unit blowing air or another fluid into the intermediate space or removing air therefrom. A force is thereby generated over the area of the membrane in a particularly simple and reliable manner over an arbitrarily large area, which serves to press on the layer element. The membrane is thus pressed uniformly onto the arrangement of layer element and support profile, resulting in a particularly uniform joint thickness between the layer element and the support profile.

In a further embodiment, the membrane is elastically stretchable. This allows the membrane to adapt particularly well to different shapes of the support profile and to stretch locally. A device provided for carrying out the process may therefore be used completely flexibly for different support profiles without, or largely without, having to carry out adaptation work.

A further embodiment may further comprise placing a gas-permeable, at least flexible surface element on the arrangement of support profile and layer element. This reliably removes any air remaining between the membrane and the layer element if an intermediate space delimited by the membrane is evacuated. The surface element may in particular be an air-permeable fabric.

The method may also include laying a foil on the arrangement of support profile and layer element for increasing sliding properties of the membrane. Particularly with larger support profiles and consequently with larger membranes, it cannot be ruled out that the membrane does not lie flat but forms local folds or waves. When the interspace is evacuated, the membrane is tightened by sliding past the support profile in the direction of pressure at the boundaries of the layer element, thereby generating a tensile force acting in the plane of the membrane. To compensate for its shape, it slides on the layer element until it is finally taut. This process is favorably influenced by the application of a foil with improved sliding properties.

Furthermore, the method may comprise locally arranging of at least one pressure stamp on the arrangement of support profile and layer element, wherein, for locally reducing the joint thickness, a lower side of the at least one pressure stamp facing the arrangement has a smaller surface area than an upper side of the at least one pressure stamp facing the compacting element. The introduction of pressure stamps allows a local increase in pressure on the relevant joining partners. This may lead, for example, to different thicknesses of bonded joints or to different properties.

Further, the method may comprise inserting at least one bushing into a bore extending through the arrangement, wherein the at least one bushing is covered by one of the at least one pressure stamp. Inserts in the form of the at least one bushing are introduced in a positionally accurate and defined manner.

The invention relates analogously to a system for coating a metallic support profile with a layer of a corrosion-resistant material, comprising a receptacle for holding the metallic support profile with a surface to be coated, a layer element of the corrosion-resistant material, which layer element is adapted to the surface to be coated, an adhesive substance for adhering the layer element to the surface to be coated, a compacting element dimensioned to cover the surface to be coated as well as the layer element arranged thereon, and a drive device which is couplable with the compacting element and is adapted to be coupled to the surface to be coated, a compacting element dimensioned to cover the surface to be coated and the layer element disposed thereon, and drive means coupleable to the compacting element and designed to press the compacting element onto the layer element with a predetermined force and for a predetermined time, wherein the compacting element is elastically deformable to conform to the shape of the arrangement during pressing. The drive means may be a device adapted to press the compacting element onto the arrangement. As shown above, the drive device may comprise an air conveying unit which applies a pressure to one side of the compacting element so that it is pressed onto the arrangement. However, it is also possible to use one or more actuators that act on the compacting element.

In this case, the receptacle may be trough-shaped and have a holder for holding the support profile in a fixed position. The holder may comprise a clamp or other profile structure supporting tool. A trough shape may allow the support profile to be enclosed by edges of the trough shape in the height direction, so that the receptacle would then only need to be covered by a membrane to form the aforementioned gap. It may be useful to then arrange an air conveying unit on an underside of the receptacle, which is in direct fluid communication with the intermediate space formed by the receptacle.

In one embodiment, the compacting element may include a gas-impermeable membrane spanning the receptacle to create a gas-tight space between the receptacle and the membrane, wherein the drive means comprises a fluid pump that applies a negative pressure to the space such that the membrane is forced onto the layer element and the support profile.

The receptacle may comprise a cover placeable on a side of the membrane facing away from the support profile, wherein the drive means is configured to generate an overpressure in a space present between the membrane and the cover. The drive means therefore feeds air into the interspace to generate the pressure therein.

The system may further include a gas-permeable, at least flexurally soft surface element for laying on the support profile/layer element arrangement.

The system may further comprise an element to increase sliding properties of the membrane.

Finally, the system may further comprise at least one compression stamp for application to the arrangement of the support profile and the layer element, wherein a lower side of the at least one compression stamp facing the arrangement has a smaller area than an area on an upper side of the at least one compression stamp facing the compacting element.

BRIEF DESCRIPTION OF THE FIGURES

In the following, the attached drawings are used to illustrate examples in more detail. The illustrations are schematic and not to scale. Identical reference signs refer to identical or similar elements. They show.

DETAILED DESCRIPTION OF EXEMPLARY EMBODIMENTS

Figure 1:
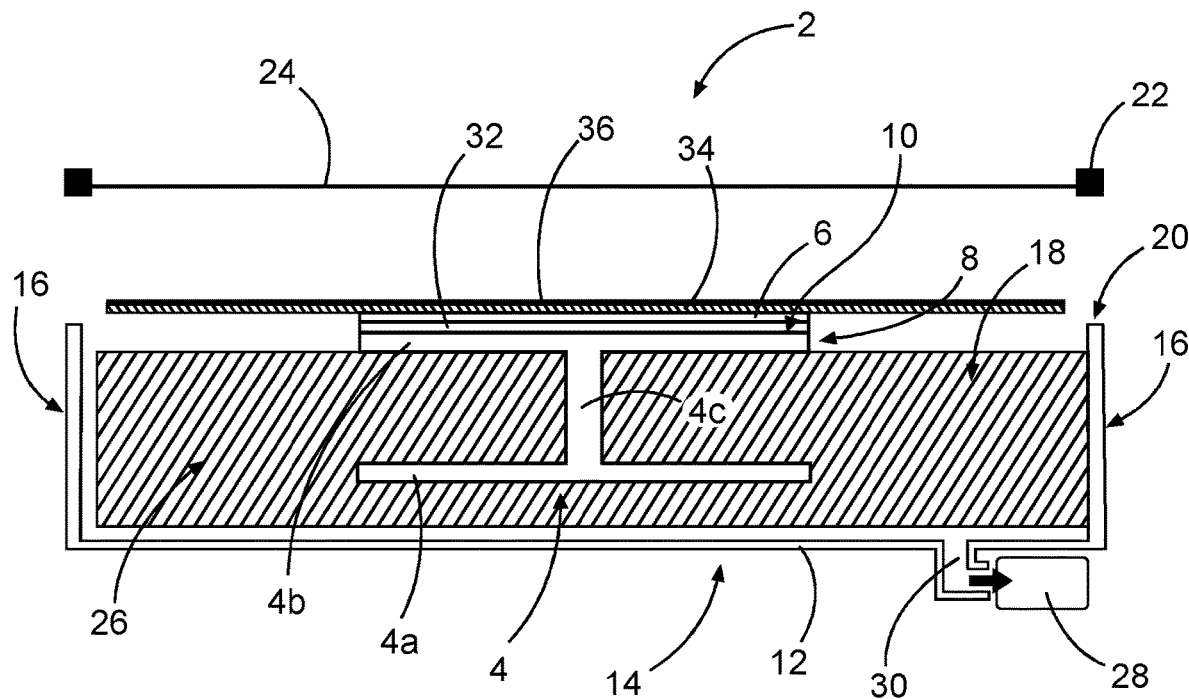
FIGS. 1 to 3 a schematic representation of a system for coating a metallic support profile according to an embodiment.

FIG. 1 shows a sectional view of a system 2 for coating a metallic support profile 4 with a layer of a corrosion-resistant material, shown here as a layer element 6.

The support profile 4 is exemplarily shown as a double T-beam, which extends perpendicular to the drawing plane. The support profile 4 has a lower chord 4a and an upper chord 4b arranged at a distance therefrom. A web 4c may be arranged between the two chords 4a and 4b, by way of example. Alternatively, two laterally arranged webs 4c could be provided, which are spaced apart from each other and define the width of the support profile 4. The lower web 4a may be narrower than the upper web 4b and vice versa. On an upper side 8, i.e. on the upper chord 4b on a side facing away from the lower chord 4a, lies a surface to be coated 10. It is understood that completely different support profiles are usable, which have different shapes. It is preferred that the surface 10 to be coated is directable upwards in the drawing plane.

The support profile 4 is located in a gas-impermeable receptacle 12, which here is of trough-shaped design by way of example and has a bottom surface 14 which is surrounded by side surfaces 16.

A holder 18 is located in the receptacle 12 for holding the support profile 4 in a fixed position. The holder 18 is designed here, by way of example, in the form of a plurality of profile pieces which are in flush contact with the support profile 4 and undercuts arranged therein and with the receptacle 12, so that the support profile 4 cannot slip in the receptacle 12. Alternatively, it would also be conceivable to have clamping holders or other devices that have to be mechanically clamped to the support profile 4 and are arranged, for example, on the bottom surface 14. The aim is to keep the upper side 8 or the surface to be coated 10 in a defined orientation so that a certain force can temporarily act on the surface 10 to be coated without the support profile 4 slipping.

For placing on an upper circumferential edge 20 of the side surfaces 16, a circumferential, closed clamping frame 22 is provided, which spans an elastic and gas-impermeable membrane 24. By placing the clamping frame 22 or the membrane 24 on the edge 20, a 1 losed intermediate space 26 is formed with the receptacle 12. A vacuum pump 28 is arranged on the bottom surface 14 as an air conveying unit and is in fluid communication with the intermediate space 26 via an air connection 30. When the clamping frame 22 or the membrane 24 rests on the edge 20 of the receptacle 12, the intermediate space 26 can be evacuated by operating the vacuum pump 28, so that the membrane 24 presses uniformly onto the support profile 4 under the effect of the ambient pressure.

On the surface to be coated 10, there is a layer 32 of an adhesive, curable substance on the surface 10. The layer element 6 lies on top. The layer element 6 and the layer 32 can already be combined with each other before the layer element 6 is applied, by brushing on, spraying on or another application process. On the other hand, it is conceivable that the layer 32 is already arranged on the surface to be coated 10 before the layer element 6 is applied. Furthermore, it is conceivable that the layer 32 is formed by two partial layers before the layer element is applied, which are each located on the layer element 6 or on the surface 10 to be coated and are combined with one another to form a common layer 32 when the layer element 6 is applied.

In this embodiment, a gas permeable fabric 34 is located on the layer element 6 and is covered there by a foil 36 which is preferably slidable. The membrane 24 rests thereon and can slide on the foil 36 to assume an orientation following the development of force during evacuation, thereby tightening. When the vacuum pump 28 is operated, it evacuates the intermediate space 26 so that the membrane 24 is pressed onto the foil 36. Air that is between the film and the layer element 6 is forced out through the gas-permeable fabric 34. This may be appropriate for particularly long lengths or sloping shapes. In the case of support profiles 4 with a simpler structure, the fabric 34 may also be omitted. The layer element 6 is pressed onto the layer of adhesive fabric 32 and the surface 10 to be coated. The vacuum in the intermediate space 26 is maintained until the adhesive substance 32 has cured and the layer element 6 adheres to the surface 10, forming a defined joint thickness.

Figure 2:
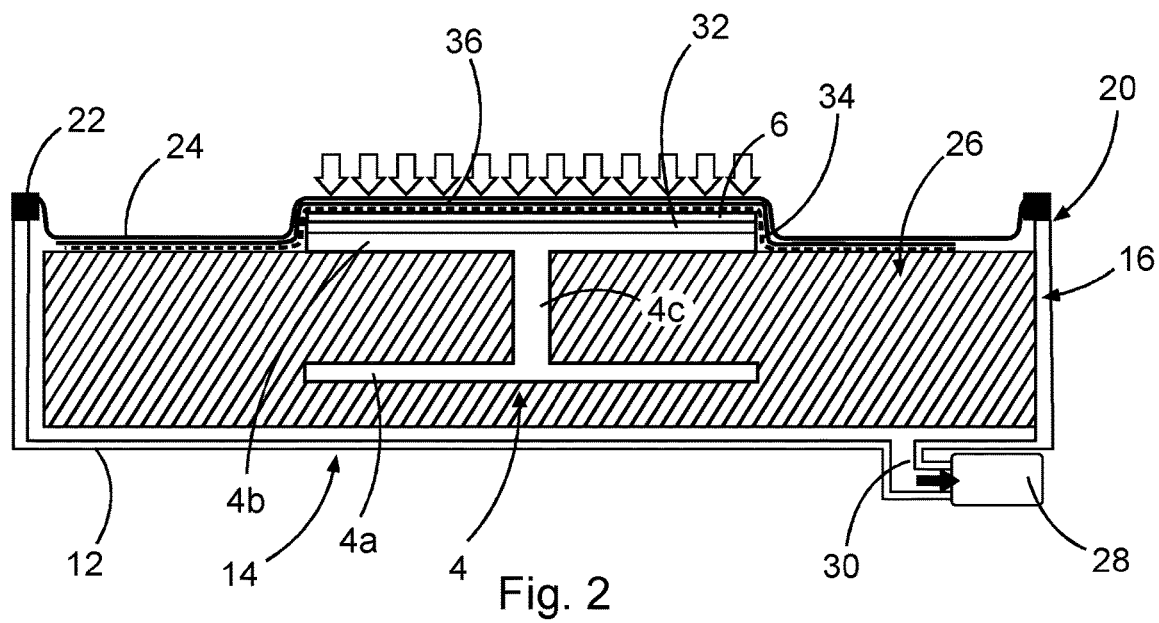

This process is shown in FIG. 2. There, the intermediate space 26 is evacuated so that the membrane 24, the foil 36 and the gas-permeable fabric 34 are pressed onto the holder 18 and the arrangement of foil 36, gas-permeable fabric 34, layer element 6 and layer 32. The holder 18 is embodied herein as aforesaid and fills a majority of the intermediate space 26, including the support profile 4, so as to extend to a region of the intermediate space 26 adjacent the top side 8 thereof. Consequently, the membrane 24 can rest thereon during evacuation and is thereby protected from damage by shearing action on edges of the support profile 4.

Figure 3:
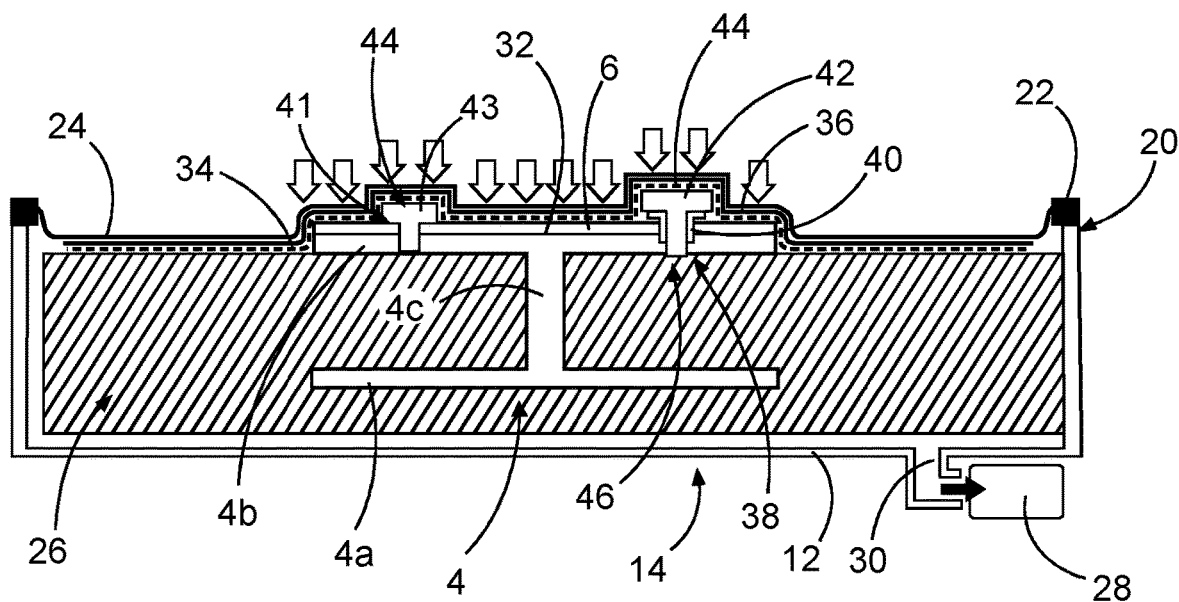

In FIG. 3, it is shown by way of example that the support profile 4 has a bore 38 into which a bushing 40 is inserted. It can be useful to press the bushing 40 through the membrane 24 in the direction of the support profile 4 with a higher force than the directly adjacent layer element 6. For this purpose, a pressure stamp 42 is used as an example, which has a larger area on an upper side 44 facing the membrane 24 than on a lower side 46 facing away from it. Since a surface on the upper side 44 of the bushing 40 is larger than an upper boundary surface of the bushing 40, a stronger force is exerted on the bushing 40 than would be possible directly through the membrane 24 on the bushing 40.

As shown in the left half of FIG. 3, another pressure stamp 43 can also be used to reduce only local adhesive layer thicknesses. For this purpose, the pressure stamp 43 presses directly onto the layer element 6 with a shoulder surface 41 on the lower side 46, which has a smaller surface area than an upper side 44 facing the membrane 24.

Figure 4:
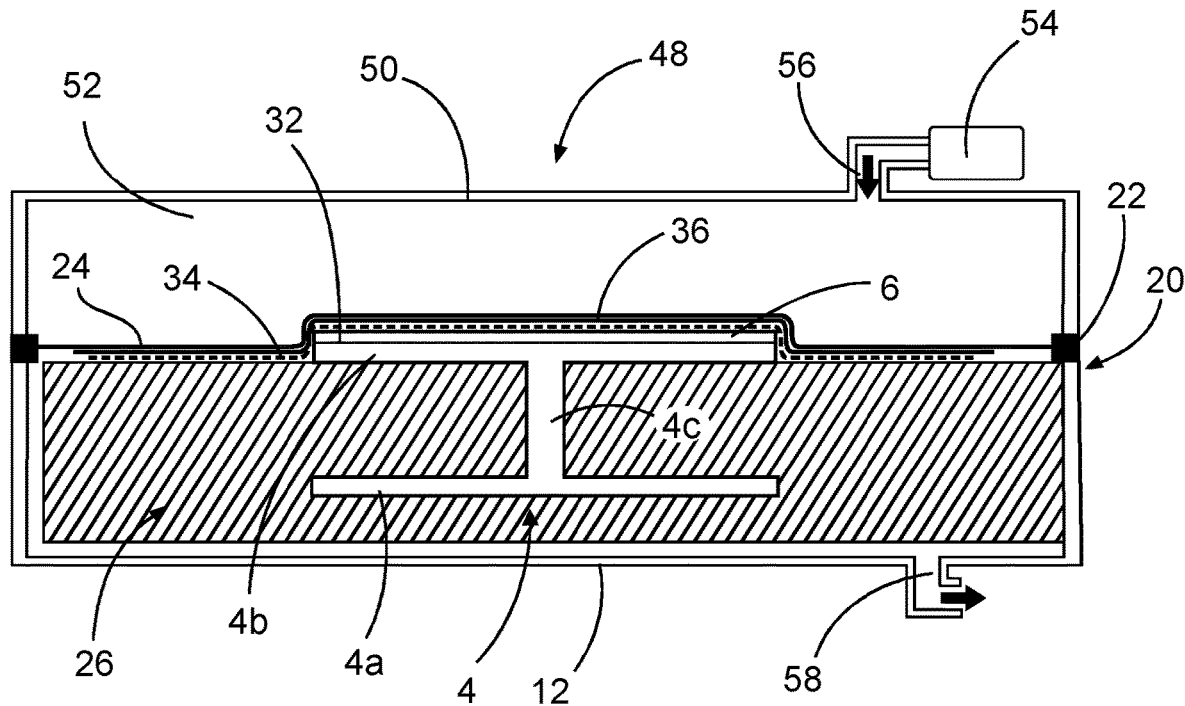
FIG. 4 a schematic representation of a system for coating a metallic support profile according to a further embodiment.

FIG. 4 shows a slight variation of the system 2 in the form of a system 48, in which a fixed cover 50 is provided, which on a side facing away from the receptacle 12 forms an intermediate space 52, which is filled with pressurized fluid, for example air, by a fluid conveying unit 54 via a fluid supply port 56. This creates an overpressure which acts on the membrane 24 arranged underneath and presses it in the direction of the support profile 4. At the same time, air can flow outwardly from the space 26 below the membrane 24 through an air outlet 58 disposed in the bottom surface 14 to equalize pressure to assist movement of the membrane 24.

Figure 5:
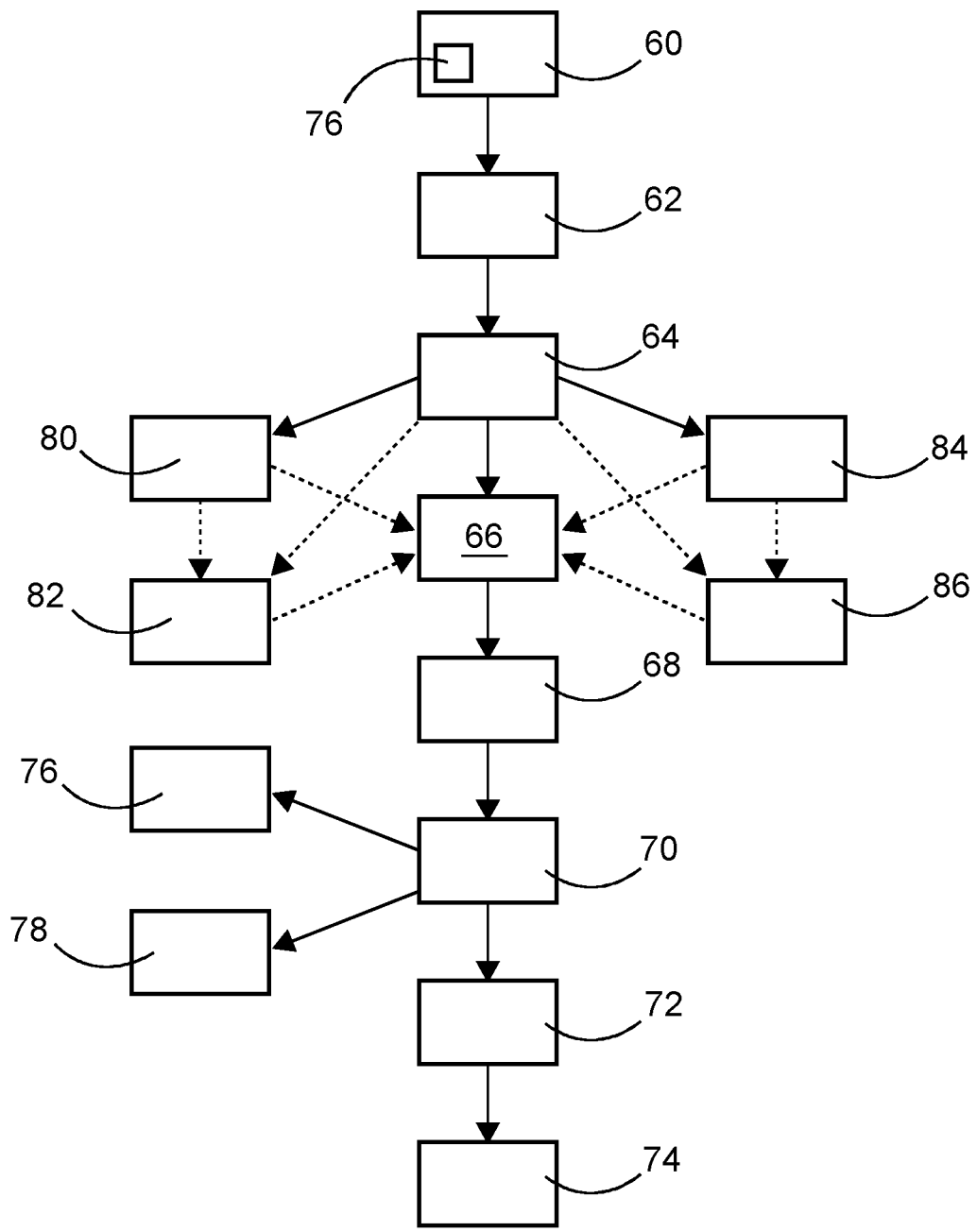
FIG. 5 a schematic representation of a process for coating a metallic support profile according to an embodiment.

FIG. 5 schematically shows the method for coating a metallic support profile. The method comprises the steps of providing 60 the metallic support profile 4 with the surface 10 to be coated, providing 62 the layer element 6 of the corrosion-resistant material adapted to the surface 10 to be coated, applying 64 the adhesive, curable substance to at least one of the surface 10 to be coated and the layer element 6, applying 66 the layer element 6 to the surface 10 to be coated, covering 68 the arrangement of support profile 4 and layer element 6 by a compacting element, which can be implemented, for example, in the form of the membrane 24, pressing 70 the layer element 6 onto the surface 10 to be coated by means of the compacting element 24 in order to achieve a predetermined joint thickness occupied by the adhesive substance, curing 72 the adhesive substance while maintaining the joint thickness in order to generate a bond, and removing 74 the compacting element 24.

Providing 60 the support profile 4 exemplarily comprises retaining the support profile 4 in the receptacle 12. As mentioned, covering 68 may comprise covering by the gas impermeable membrane 24 sealingly connected to the receptacle 12 or a cover 50 disposed thereover. By way of example, pressing 70 on the layer element 6 comprises evacuating 76 the space 26 between the receptacle 12 and the membrane 24, or comprises increasing 78 the pressure in the space 52 between the membrane 24 and the cover 50. The method may further comprise placing 80 a gas-permeable, at least flexurally flexible surface element 34 on the arrangement of the support profile 4 and the layer element 6. Further, the method may comprise placing 82 foil 36 on the arrangement of support profile 4 and layer element 6 to increase sliding properties of the membrane 24. Exemplarily, for locally reducing joint thickness, the method comprises locally disposing 84 at least one pressure stamp 42, 43 on the arrangement of support profile 4 and layer element 6, wherein a lower side facing the arrangement has a smaller area than an area on an upper side of the at least one pressure stamp 42, 43 facing the compacting element 24. Exemplarily, a bushing 40 is further disposed 86 in a bore 38 extending through the arrangement, wherein the at least one bushing 40 is covered by one of the at least one pressure stamp 42, 43.

In addition, it should be noted that "comprising" or "comprising" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as a limitation.

LIST OF REFERENCE SIGNS 2 system
4 support profile
4a lower chord
4b upper chord
4c web
6 layer element
8 upper side
10 surface to be coated
12 receptacle
14 bottom surface
16 Side surface
18 holder
20 edge
22 clamping frame
24 membrane
26 intermediate space
28 vacuum pump
30 air connection
32 Layer
34 gas permeable fabric
36 foil
38 bore
40 bushing
41 shoulder surface
42 pressure stamp
43 pressure stamp
44 upper side
46 lower side
48 system
50 cover
52 intermediate space
54 Air conveying unit
56 air supply port
58 air outlet

The invention claimed is:

1. A system for coating a metallic support profile with a layer of a corrosion-resistant material, comprising:
    a receptacle for holding the metallic support profile with a surface to be coated, wherein the metallic support profile is a rail configured for installation in a cabin of a commercial aircraft and includes undercuts arranged therein,
    a layer element of the corrosion-resistant material, the layer element adapted to the surface to be coated,
    an adhesive substance for adhering the layer element to the surface to be coated,
    a compacting element dimensioned to cover the surface to be coated and the layer element disposed thereon, wherein the compacting element is configured to maintain a predetermined joint thickness occupied by the adhesive substance while curing, and
    a drive device which is couplable with the compacting element and is configured to press the compacting element onto the layer element with a predetermined force and for a predetermined time,
        wherein the compacting element is elastically deformable so that the compacting element adapts to the shape of an arrangement of the metal support profile and the layer element during pressing, wherein the receptacle is trough-shaped and has a holder for holding the support profile in a fixed position, and wherein the holder comprises a plurality of profile pieces in flush contact with the metallic support profile and the undercuts, and with the receptacle such that the metallic support profile cannot slip in the receptacle.

2. The system according to claim 1, wherein the compacting element comprises a gas impermeable membrane spanning the receptacle to create a gas-tight space between the receptacle and the membrane, and wherein the drive device comprises a fluid pump which applies a negative pressure to the space so that the membrane is forced onto the layer element and the support profile.

3. The system according to claim 2, wherein the receptacle comprises a cover placeable on a side of the gas impermeable membrane facing away from the support profile, and wherein the drive device is configured to generate an overpressure in a space present between the gas impermeable membrane and the cover.

4. The system according to claim 1, further comprising a gas-permeable, at least flexurally soft surface element for laying on the arrangement of support profile and layer element.

5. The system according to claim 2, further comprising a foil for overlaying the arrangement of the support profile and layer element to enhance sliding properties of the membrane.

6. The system according to claim 1, further comprising at least one pressure stamp for application to the arrangement of support profile and layer element, wherein a lower side of the at least one pressure stamp facing the arrangement has a smaller area than an area on an upper side of the at least one pressure stamp facing the compacting element.

\* \* \* \* \*